United States Patent
Dey et al.

(10) Patent No.: US 11,102,149 B2
(45) Date of Patent: Aug. 24, 2021

(54) MODULAR, FLEXIBLY CONNECTED SWITCH-PORT INPUT-OUTPUT CARDS

(71) Applicant: HEWLETT PACKARD ENTERPRISE DEVELOPMENT LP, Houston, TX (US)

(72) Inventors: Nilashis Dey, Houston, TX (US); John M. Lenthall, Houston, TX (US); David A. Selvidge, Cypress, TX (US); Minh Nguyen, Katy, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 33 days.

(21) Appl. No.: 16/723,351

(22) Filed: Dec. 20, 2019

(65) Prior Publication Data
US 2021/0194826 A1    Jun. 24, 2021

(51) Int. Cl.
*H04L 12/947* (2013.01)
*H04L 12/933* (2013.01)
*H04L 12/935* (2013.01)

(52) U.S. Cl.
CPC ............ *H04L 49/25* (2013.01); *H04L 49/101* (2013.01); *H04L 49/30* (2013.01)

(58) Field of Classification Search
CPC ........ H04L 49/25; H04L 49/101; H04L 49/30
See application file for complete search history.

(56) References Cited

U.S. PATENT DOCUMENTS

| | | | | |
|---|---|---|---|---|
| 5,428,806 A | * | 6/1995 | Pocrass | G06F 13/409 710/100 |
| 7,426,210 B1 | * | 9/2008 | Miles | H04J 14/0223 370/400 |
| 8,520,563 B2 | * | 8/2013 | Ono | H04L 5/16 370/282 |
| 9,490,560 B2 | * | 11/2016 | Chawla | H01R 12/79 |
| 9,519,608 B2 | * | 12/2016 | Thomas | G06F 13/4282 |
| 9,641,451 B2 | * | 5/2017 | Tsai | H04L 47/76 |
| 10,088,827 B2 | * | 10/2018 | Miyazaki | G05B 19/406 |
| 10,568,238 B1 | * | 2/2020 | Leung | G06F 1/185 |

* cited by examiner

*Primary Examiner* — Chandrahas B Patel
(74) *Attorney, Agent, or Firm* — Nolte Lackenbach Siegel

(57) ABSTRACT

Switches and groups of IO ports may be divided into separate switch modules and IO modules that can be connected by high-speed low-loss management cables in a variety of configurations. Thereafter, the separate modules may be replaced independently of each other. The switch module may recognize, and thereafter ignore, unconnected ports, removing the performance penalty that sometimes arises when fewer than all available ports are connected. The switch module may rapidly adjust to addition, subtraction, and replacement of connected IO modules.

16 Claims, 8 Drawing Sheets

MODULAR, FLEXIBLY CONNECTED SWITCH-PORT INPUT-OUTPUT CARDS

BACKGROUND

A "switching fabric" is a combination of hardware and software that uses multiple switches—which are themselves a combination of hardware and software—to control traffic passing through one or more network nodes. The term can refer to either the network topology, a complex grid of connections, switching paths, and nodes, or more broadly to all of the network's switching hardware and software in the network.

Unlike an Ethernet or broadcast network that carries traffic on a single link, a switching fabric spreads traffic across multiple concurrently operating links. Transmitted data packets include header information for identification, routing and error detection, and correction. A switching fabric network's throughput and disruption tolerance often depend on the number of available physical links, which may be increased by adding more switches, transmission lines, and input-output ("IO") ports to the network.

High-speed fabric data rates have been rapidly increasing in recent years to accommodate high-bandwidth applications such as High Definition Television ("HDTV") and cloud computing. Current trends include increasing the Nyquist frequencies (related to sampling rates) and/or the modulation complexity (e.g., modulating between four voltage levels rather than two) of the signals transmitted over the switching fabric.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
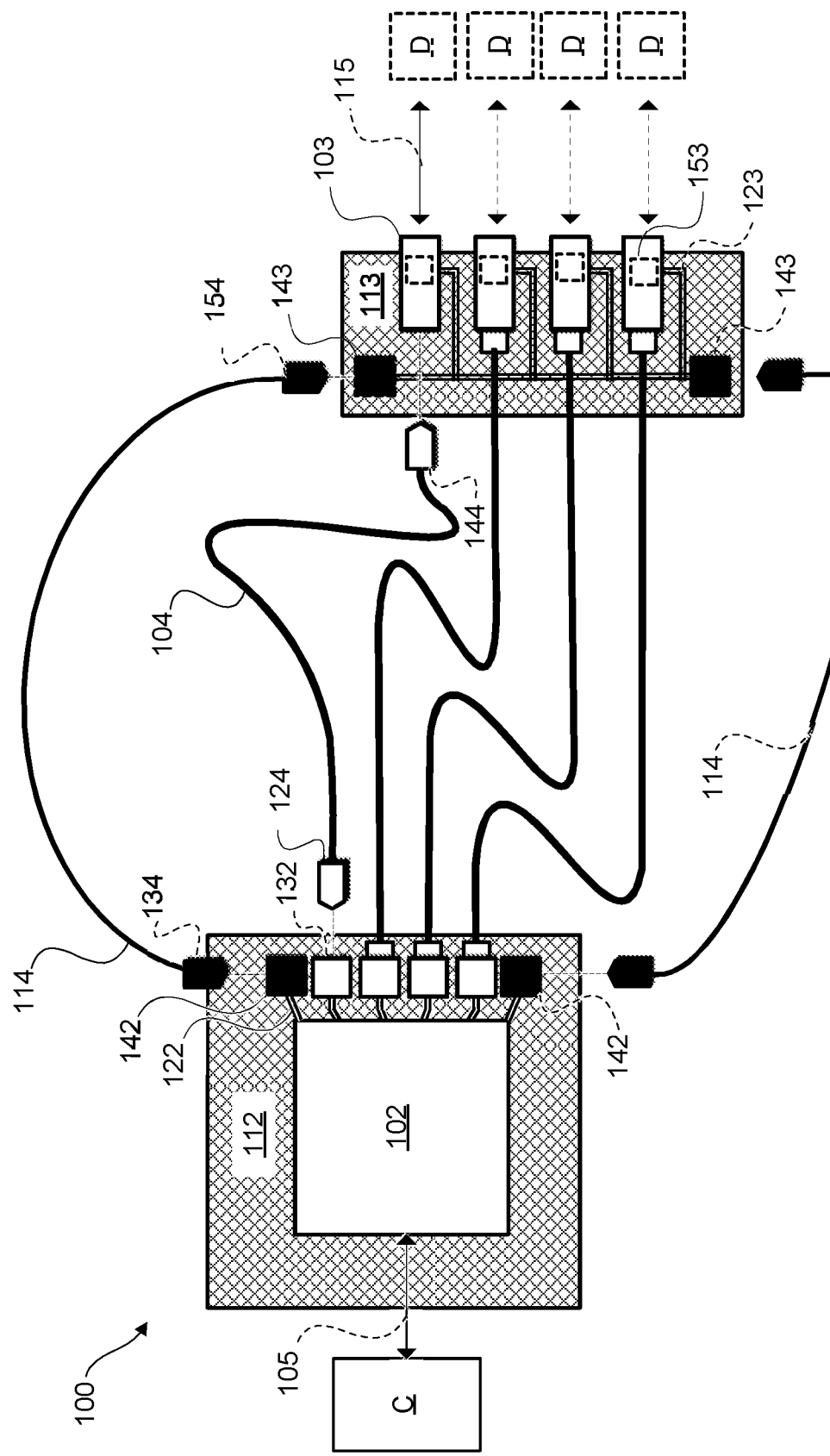
FIG. 1 is a top view of a modular switching system with a switch module and a separate IO module according to one or more examples of the disclosure.

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more," Moreover, examples herein are intended to be illustrative only and are presented for discussion purposes and not by way of limitation.

The demand for higher data rates, higher throughput, and greater tolerance of disruptions from switching fabric networks is expected to continue increasing. Conventional printed circuit boards ("PCBs") are reaching a limit in their accommodation of these increased demands. For example, every time a data packet traverses a PCB-based switch with integrated input and output ports, it passes through two PCB traces: (1) between the input port and the switch and (2) between the switch and the output port. Although each of these traces is fairly short, the losses accumulate when each data packet traverses multiple switches in a typical switching fabric.

Moreover, conventional PCBs that integrate switches and IO ports have a fixed number of IO ports on each card. Different applications may use different numbers of IO ports or different ratios of switch/server connections to inter-switch connections. If a system uses a different number of ports than the available original equipment manufacturer ("OEM") PCBs offer, the designer must either (1) arrange for the fabrication of a custom PCB with the desired number of ports or (2) buy an available PCB with more ports and have the excess ports terminated. In some cases, utilizing less than all the available ports may compromise performance.

In addition, when a switching fabric network of conventional switch-and-IO integrated PCBs is repaired or upgraded, the switches and IO ports must be swapped out together even if only one of the components actually needs replacement. Disposal of the excess e-waste adds to the network's cost of ownership.

Some existing solutions have trended toward greater integration to shorten the trace lengths between components. This may increase the cost and complexity of the minimum swappable components as well as making scaling or other modifications of existing switching fabric networks more difficult. Other existing solutions have concentrated on higher-conductivity trace materials. These materials may themselves be expensive. Additionally or alternatively, special equipment and processes may be needed to handle the unusual materials, and constraints may be imposed on their storage, transport, or disposal.

The present disclosure presents a solution to one or more of these problems as well as problems not identified herein. Ultra-low-loss cables, which may be electrical or optical, have been developed to handle high-speed data transmission. These cables have significantly lower loss than conventional PCB traces. Interconnects are being developed to divert signals away from PCB traces. Various types of cable assemblies address specific applications. For example, they may connect IO assemblies to chips, chips to backplanes, or boards to boards, replacing rigid backplanes and chip-to-chip connections on a single board.

A modular switching system may include a switch module and a separate IO module. Ports on the IO module are connected to corresponding pins or other access points on the switch module by one or more high-speed cables that provide communicative coupling. In some examples, multiple IO modules may be connected to a single switch module mounting a single application-specific integrated circuit ("ASIC"). The IO modules may be connected in parallel (e.g., stacked) or serial (e.g., chain or ring) configurations. A mufti-channel bi-directional interface facilitates communication of management signals between a switch module and one or more IO modules. The communication may be carried out according to a switching-system management process.

In some examples of the switching-system management process, a switch module may dynamically detect the number, configuration, and status of all IO modules connected to it and configure a bitstream of recipient-specific management messages (i.e., each message from the switch is specifically directed toward a particular IO module in its management signal path). Each recipient IO module reads the bitstream. In a serial configuration (e.g., chain or ring), each of the IO modules may identify a message directed to it, remove those bits from the bitstream, and pass the remainder downstream to the next IO module in the series. As the bitstream travels downstream from the switch module, each recipient IO module removes the recipient-specific management message directed to it, shortening the bitstream until, eventually, only one management message remains for the last IO module in the serial system. Because the bitstream is shorter at the end of the management signal path than at the beginning, the average bitstream length being transmitted down the path is shorter than it would be if every recipient passed along the entire incoming bitstream.

In some examples of serial configurations, the recipient-specific management messages are sent in order of the recipients' proximity to the switch module. At any point in the system, the next IO module in the management signal's path is the specified recipient of the first message in the approaching bitstream. Therefore, each recipient IO module accesses and extracts the first message and passes the rest downstream without needing to interact with messages specific to any other recipients. For example, if all the messages were constrained to a constant length of L bits, each recipient could extract the first L bits and pass along the rest. Alternatively, if the messages were separated by a delimiter code, each recipient could begin extracting at the start of the bitstream and stop after receiving the delimiter, regardless of the message length.

Meanwhile, the connected IO modules may send a bitstream of sender-specific management messages upstream in the management signal path to the switch module (i.e., each message includes a way to identify which IO module sent it). For example, components connected to the sender module's IO ports may send commands, queries, status, or other messages to the switch module through the ports. Each IO module receiving the bitstream of sender-specific management messages passes it upstream toward the switch module, optionally adding a message of its own. Thus, the bitstream transmitted by the IO module farthest down the management signal path from the switch module may include only that single sender's message. Subsequently, each upstream sender may add another sender-specific management message to the bitstream. The bitstream that finally reaches the switch module includes the sender-specific management messages from all the senders in the management signal path.

The above management methods allow a single switch module to drive multiple IO modules. These methods may be realized as instructions stored on a non-transitory machine-readable information-storage medium. Such a storage medium may be a dedicated device or a component embedded in a larger system such as a computer, a structure for mounting switch trays, a distributed computing network, or some other computing or communication system.

This approach offers flexibility in both initial set-up and later modification of switching systems. The low loss of the high-speed cables allows a single switch module to propagate a reliable management signal to and through a series of IO modules, thus controlling any or all of the IO modules in the series. In addition, leaving one or more of the available switch connectors empty (i.e., unconnected) does not introduce the performance penalties that may arise in some existing systems.

A network administrator is thus freed to initially provide only the immediately desired number of IO ports, rather than being forced to overbuy and prematurely overbuild around an integrated switching card with all the switch connectors filled. At a later time, if more capability is desired, more switch modules and/or IO modules can easily be added. The smaller module size and the flexibility of the cables may also allow more expansion in a smaller physical space than some existing integrated-PCB systems. Moreover, if an upgrade or repair to the system calls for replacement of only a switch or only some IO-port hardware, the network administrator may replace one or the other without needing to replace both.

The disclosed examples may improve network functionality as follows: the separate switch modules and IO modules connected by high-speed cables support higher bandwidth and higher data rates than a single integrated PCB with conventional traces. This will allow a greater number of networked devices to communicate without the slowdowns associated with network overload or the signal errors that may result from lossy lines.

The disclosed examples may confer the following commercial benefits: the separate switch modules and IO modules connected by high-speed cables are less costly and complex to manufacture than some existing integrated PCBs with special high-conductivity traces. Unlike some exotic trace materials, the disclosed modules and connecting cables do not impose additional regulatory constraints on deployment and disposal. Flexible cable connections allow the IO modules connected to a switch module to be stacked if horizontal space is limited or spread out in a single plane if vertical space is limited. This flexibility contributes to ease of scaling.

Additional technological benefits may include a flexible, scalable IO port count. The network may be set up initially with only enough IO modules to meet initial needs. More IO modules and/or switch modules may be added later to meet future needs. For example, some applications may utilize an optimized ratio of the number of server connections to the number of inter-switch connections. Achieving these ratios with integrated PCBs might involve a custom build, but the disclosed switch modules and IO modules may be assembled to provide any desired ratio in a modular system. Disclosed examples of management processes allow a switch module to sense the configurations of its connected IO modules on the fly, allowing "hot-swapping" of modules and reducing the labor demands of configuration changes, Some of the disclosed management methods minimize the lengths of message bitstreams, the amount of analysis done by each IO module, or both, thereby increasing processing speed and network stability. Finally, the ability to independently re-use or replace either the switch module or the IO module may reduce waste and other costs of repairs and upgrades.

A modular switching system may include a switch module that includes a switch (e.g., a switch ASIC) and a separate IO module with two or more IO ports. The switch module is connected to the IO module by a production-data cable, a management-message cable, and a power cable. The switch module is capable of detecting a "READY" status of the first IO module and a "connected or disconnected" state of its IO ports. In some examples, the production-data cable may be physically separate from the management-message cable. The power cable may be combined with the management-message cable. The management-message cable may or may not be a low-loss high-speed cable.

Upon detecting that one IO port is disconnected and another IO port is connected, the switch module may send recipient-specific management messages to, and listen for sender-specific management messages from, the connected IO port but not the disconnected IO port. A second IO module may be added to the modular switching system by connecting it with a second production-data cable, a second management-message cable, and a second power cable. In some examples, the second management-message cable and the second power cable may connect the second IO module to the switch module, so that the first and second IO module are connected to the switch module in parallel. Alternatively, the second management-message cable and the second power cable may connect the second IO module to the first IO module, so that the first and second IO module are connected to the switch module in a chain series.

Optionally, when the switch module has multiple management ports, a chain of IO modules connected to one of the ports may be converted to a ring by connecting an additional "ring-completion" management-message cable to the switch module through an unoccupied management port of the same switch module. Power may be supplied along the same path to provide redundancy and fault isolation. Unless a system condition precludes it, the second IO module may receive its power from the first IO module. However, if the first IO module becomes unable to supply the power, the switch module may take over providing power directly to the second IO module.

A switching fabric may include multiple second-level switching systems, multiple first-level switching systems, and multiple network nodes Each of the network nodes may be connected to at least one of the first-level switching systems. Each of the first-level switching systems may be connected to more than one of the second-level switching systems. At least one of the first-level switching systems or the second-level switching systems may include a switch module connected to an IO module by a production-data cable, a management-message cable, and a power cable.

The IO module may be removable and replaceable while the switching system continues to operate. The switching system may be expandable by connecting an additional IO module to the switch module, or to an installed IO module, while the switching system continues to operate. The second-level switching systems, the first-level switching systems, and the network nodes may be arranged in a regular topology of repeating smaller patterns. The second-level switching systems, the first-level switching systems, and the network nodes may be arranged in a fat-tree topology.

A method of operating a switching system may include collecting configuration and status information specific to each of one or more IO modules connected to each other in series with at least one of the IO modules directly connected to a switch module. After determining that all the IO modules in the series have a "READY" status, the switch module may begin transmitting a bitstream containing a recipient-specific management message to the series, beginning with the directly connected IO module and continue to transmit the recipient-specific management message through successive IO modules in the series until the recipient-specific management message reaches the specified recipient IO module. Extracting, analyzing, and responding to the recipient-specific management message may be done at the specified recipient IO module.

The collecting may be triggered by powering on the switching system. The collecting may be periodically repeated as the switching system operates. The responding to the recipient-specific management message comprises transmitting the response as a sender-specific management message to the switch module through any intervening IO modules in the series. The recipient of a recipient-specific management message or the sender of a sender-specific management message may be derivable from the message's position in a multi-message bitstream.

The use of ultra-low loss high-speed cable in place of PCB traces as an implementation technique for high-speed data channels has opened up new design opportunities, including the scalable modular switching systems described herein. These switching systems may include separate, independent switch modules and IO modules connected by low-loss high-speed cables. The IO modules may be connected in series, in parallel, or in a mixture of both. Such modular systems and their management processes are a departure from the trend of ever-increasing integration of more electronic components on single PCBs.

FIG. 1 is a top view of a modular witching system with a switch module and a separate IO module according to one or more examples of the disclosure. Instead of a single integrated PCB with a switch and IO ports connected by PCB traces as in some existing switching systems, modular switching system 100 includes switch 102 on switch module 112 and IO ports 103 (only one indicated) on IO module 113. Switch module 112 and IO module 113 may be constructed on cards, substrates, or other physical packages compatible with the operating environment. Switch module 112 may also communicate with a switch controller C over link 105. Each IO port 103 on IO module 113 may communicate with one or more networked devices D over a link 115 (only one indicated). Communication links 105 and 115 may be wired, wireless, card-to-card, or any other suitable type.

Short switch traces 122 (only one indicated) on switch module 112 connect switch 102 to one or more switch connectors 132 (only one indicated). High-speed cables 104 (only one indicated) may connect switch connectors 132 to IO ports 103 to carry high-speed production data signals between switch module 112 and IO module 113 with lower loss than standard PCB traces. High-speed cables 104 may be high-speed low-loss cables (e.g., loss less than 3 dB/m at 10-20 GHz) and may be mechanically flexible. In some examples, cable termination 124 forms a removable connection with switch connector 132, while cable termination 144 forms a removable connection with IO port 103. Optionally, cable terminations 124 and 144 may be identical so that high-speed cable 104 is symmetric and may be connected in any orientation.

In some examples, IO ports 103 include transceivers 153 (only one indicated). Transceivers 153 may be, for example, a quad small form-factor pluggable ("QSFP") transceiver. Management messages and/or power for transceivers 153 may be provided by high-speed cables 104. Alternatively, one or both may be carried by an auxiliary cable 114, which may be mechanically flexible and may or may not be a high-speed cable. A short switch trace 122 connects switch 102 to auxiliary switch connector 142 (only one indicated). Auxiliary cable 114 connects auxiliary switch connector 142 to auxiliary IO connector 143. IO traces 123 may distribute power or management signals to transceivers 153 of IO ports 103 of IO module 113.

Depending on the implementation, auxiliary IO connectors 142 and/or 143 may contain, or be connected to, active components enabling them to function as management-message ports. For example, the ports may be controllable to either actively transmit management messages or listen to them passively. In some examples, cable termination 134 forms a removable connection with auxiliary switch connector 142, while cable termination 154 forms a removable connection with auxiliary IO connector 143. Optionally, cable terminations 134 and 154 may be identical so that auxiliary cable 114 is symmetric and may be connected in any orientation.

Two or more auxiliary switch connectors 142 may optionally be provided for each switch module 112. Similarly, two or more auxiliary IO connectors 143 may optionally be provided for each IO module 113. The multiple auxiliary connectors 142, 143 may be used to connect multiple IO modules 113 in parallel, to set up a ring topology, or to ensure that connectors are easy to access in a variety of different board mounting geometries.

Because high-speed cables 104 have lower loss than some conventional PCB traces, modular switching system 100B may handle higher bandwidth, higher data rates, and more complex modulation (e.g., 4-level) compared to integrated PCBs using longer traces to connect the switch to IO ports on the same card. Because of the low loss and mechanical flexibility of the high-speed cables 104 and the potentially small size of switch module 112 and IO module 113, switch 102 and IO port 103 do not need to be mounted in a single horizontal plane as they are in integrated PCBs. This may allow modular switching system 100 to occupy a smaller space, or a greater variety of differently shaped spaces, than a comparable integrated PCB. If a repair or upgrade requires the replacement of only switch 102 or IO ports 103, the switch module 112 and IO module 113 may be replaced independently of each other, decreasing waste and facilitating re-use. Nevertheless, modular switching system 100 may transparently replace a comparable integrated PCB if the switch-controller link 105 and the networked-device interfaces 115 are compatible with switch module 112 and IO module 113.

For clarity and simplicity, only four switch connectors 132 and IO ports 103 are illustrated. However, other numbers of these components are included in the scope of disclosure. Moreover, switch module 112 may operate with some of its switch connectors 132 unconnected to a high-speed cable 104, and IO module 113 may be operated with some of its IO ports 103 unconnected to a device D or a high-speed cable 104.

Figure 2:
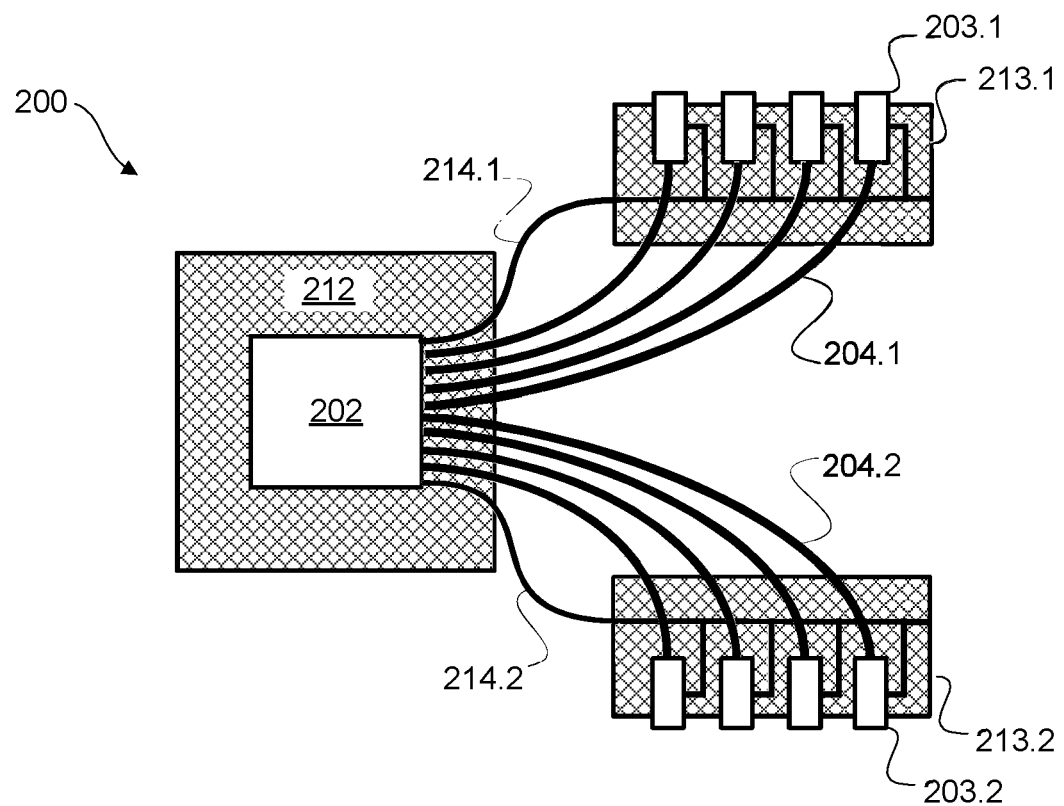
FIG. 2 is a top schematic view of a modular switching system with a different configuration than that of FIG. 1, with a single switch module controlling two IO modules in parallel.

FIG. 2 is a top schematic view of a modular switching system with a different configuration than that of FIG. 1, with a single switch module controlling two IO modules in parallel. In modular switching system 200, a first group of high-speed communication links 204.1 (only one indicated) carries production data between switch 202 and IO ports 203.1 (only one indicated) of a first IO module 213.1. Additionally, a first auxiliary communication link 214.1 may carry power and/or management messages from switch 202 to first IO module 213.1 for distribution among its IO ports 203.1. A second group of high-speed communication links 204.1 (only one indicated) carries production data between switch 202 and IO ports 203.2 (only one indicated) of a second IO module 213.2. Additionally, a second auxiliary communication link 214.2 may carry power and/or management messages from switch 202 to second IO module 213.2 for distribution among IO ports 203.2. Although this schematic view does not show connector details, IO modules 213.1 and 213.2, or any of their individual IO ports 203, may be disconnected and reconnected from switch module 212 similarly to the modules of FIG. 1.

Auxiliary communication links 214.1 and 214.2 may be bi-directional to carry management messages from switch module 212 to IO modules 213.1 and 213.2 and from IO modules 213.1 and 213.2 to switch module 212. In some examples, auxiliary communication links 214.1 and 214.2 may be multichannel or carry additional signals besides the management messages. For example, they may also carry a clock channel to sync all the IO modules 213 connected to switch module 212. Optionally, auxiliary communication links 214.1 and 214.2 may also transmit data delimiters, such as starting and ending signals for packets, frames, or other data blocks, in a dedicated delimiter channel.

Communications links 204.1, 214.1, 204.2, and 214.2 may be mechanically flexible, allowing IO modules 213.1 and 213.2 to be arranged in a wide variety of spatial relationships relative to switch module 212 or to each other. For example, IO modules 213.x may be placed on different sides of switch module 212, above or below it, at an angle, or with IO ports 203 facing one or more of their connected devices (not shown in this view).

Figure 3:
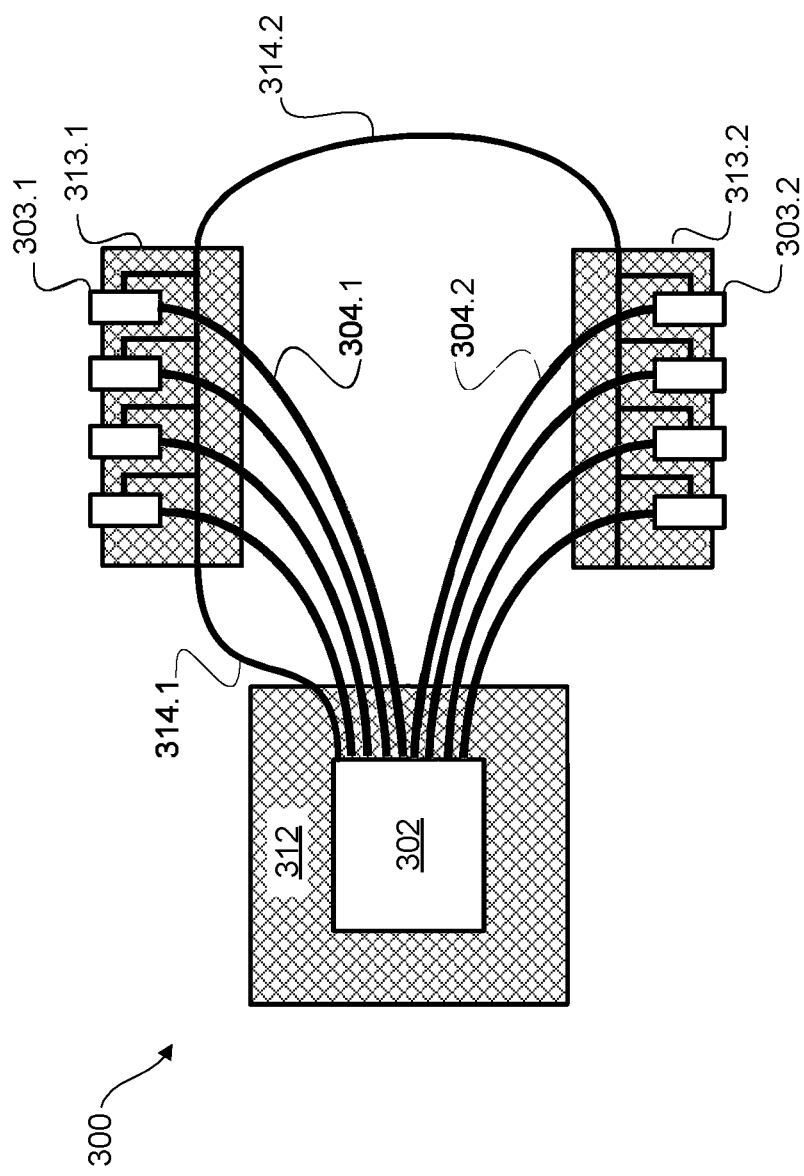
FIG. 3 is a top view of a modular switching system with a single switch module controlling two IO modules as in FIG. 2, except that the auxiliary connections are serial, according to one or more examples of this disclosure.

FIG. 3 is a top view of a modular switching system with a single switch module controlling two IO modules as in FIG. 2, except that the auxiliary connections are serial, according to one or more examples of this disclosure. The illustrated modular switching system 300 is one of a variety of configuration options made available by the modular approach.

In some examples, switch module 312 and IO modules 313.1, 313.2 may exchange production data over parallel-connected high-speed communication links 304.1 (between switch module 312 and IO module 313.1) and 304.2 (between switch module 312 and IO module 313.2). Management messages, however, are carried by auxiliary communication links 714.1 (between switch module 312 and IO module 313.1) and 314.2 (connecting IO module 313.1 and IO module 313.2 in series). Power for IO modules 313.1 and 313.2 may, depending on the implementation, be supplied by production-data cables 304.1 and 304.2, or by auxiliary communication links 714.1 and 314.2, by separate dedicated power cables (not shown), or by any other suitable arrangement.

The series of auxiliary cables 314.1 and 314.2 may be described as forming a management message path from switch module 312 to nearest downstream IO module 313.1 to farthest downstream IO module 313.2. Although only two IO modules 313.1 and 313.2 are illustrated, those skilled in the art will readily understand that the management message path may be scaled to include any practical number of IO modules 313.x (where the variable "x" represents an arbitrarily assigned identifier distinguishing each individual IO module from all the others in the chain) serially connected to each other, with the nearest downstream IO module 313.1 connected to switch module 312.

Although only the nearest downstream one IO module 313.1 has a direct management-message connection (auxiliary communication link 714.1) to switch module 312, switch module 312 may also manage downstream IO module 713.2 and any other IO module(s) that are indirectly connected through one or more upstream IO modules 713 by using a management method. The management method may be realized as a group of hardware logic circuits, as instructions stored on a non-transitory machine-readable storage medium and executed by a processor, or as a combination of both. The processor executing the instructions may be built into the switch 302 ASIC, provided by a different chip on switch module 312, or elsewhere in the network. In some examples, the instructions for the management method may reside in multiple locations, and the execution of the management method may be distributed between multiple processors in a distributed computing system. In some examples, the management method includes some operations performed at the switch module 312 and other operations performed at each of the IO modules 313.x.

Figure 4:
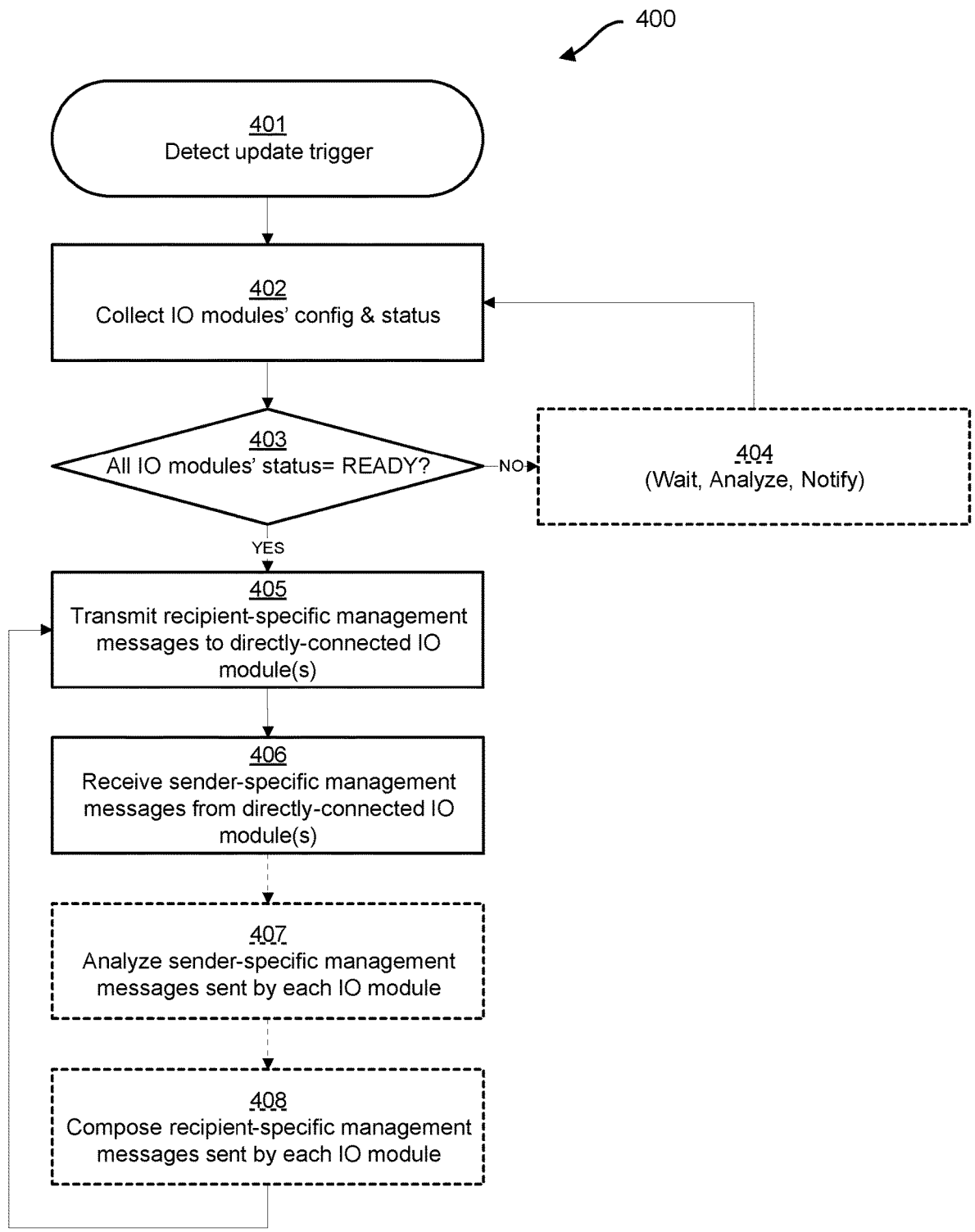
FIG. 4 is a flowchart of part of a management method enabling a switch module to control a series of IO modules connected in the manner of FIG. 3: specifically, the operations performed by the switch module.

FIG. 4 is a flowchart of part of a management method enabling a switch module to control a series of IO modules connected in the manner of FIG. 2: specifically, the operations performed by the switch module. Method 400 begins when the switch module detects an update trigger (block 401). The update trigger may be, e.g., a system power-on, a reset, a connection restoration, a hot-plug event, the passage of a pre-determined time interval since the method was performed last, or any other impetus for initiating a management function.

The switch module (or a separate processor associated with it) reacts to the update trigger (block 401) by collecting the configuration and status of all its connected IO modules (block 402). This may be done by the switch component itself or an associated processor elsewhere in the network communicating with the switch module. The configuration may include whether two or more IO modules are connected in a serial management message path and the position each of the IO modules occupies in the series. In some examples, a single IO module connected directly to the switch module may be treated as a "series of one." The status may include whether or not each of the connected IO modules is ready to receive or exchange management messages with the switch module. This part of the status information may be as simple as a single bit, with 1=READY and 0=NOT READY, or may be more complex to produce more variable responses under different conditions.

After collecting the configuration and status of all its connected IO modules (block 402), the switch module determines whether all of the modules' status is READY (block 403). If not, the switch module may optionally wait for a predetermined time, analyze conditions of the not-ready IO module, or notify another entity, such as an error logger, of the not-ready condition and any pertinent details such as when it occurred and which IO module(s) were involved (optional block 404). Whether or not any of the optional actions are performed, the switch module eventually repeats the collection of configuration and status information (at 402) for all its connected IO modules (block 402). When the switch module determines that all of its connected IO modules are "READY" (block 403), it may transmit recipient-specific management messages for any or all of the IO modules. The switch module transmits all its recipient-specific management messages to its directly connected IO module(s) (block 405). If a directly-connected IO module is part of a series, the directly-connected IO module will receive recipient-specific management messages for other IO modules in the series as well as itself.

The connected IO modules, upon receiving the sender-specific management messages, perform another part of the method that will be described with reference to FIG. 5. The connected IO modules also compose and transmit sender-specific management messages in the other part of the method that will be described below relative to FIG. 5.

At any time after determining that all of its connected IO modules are "READY" (block 403), the switch module may receive sender-specific management messages from its directly-connected IO module(s) (block 406). The switch module analyzes the received sender-specific management messages (block 407) to select appropriate responses. The switch module then uses the sender-specificity feature of the received messages to compose a recipient-specific management message for each of the senders, containing the selected response to that particular sender's message (block 408). Once composed, the sender-specific management messages are sent in the same manner as the initial batch (return to block 405). The switch module continues receiving sender-specific management messages, selecting responses, composing recipient-specific management messages containing the selected responses, and transmitting the sender-specific management messages to its connected IO modules.

In one example of the management method, all the IO modules are connected to the switch module in parallel. In such a configuration, every IO module is a directly-connected IO module that receives only its own recipient-specific management messages from the switch module and transmits only its own sender-specific management messages to the switch module. If, however, the modular switching system includes some IO modules connected directly to each other in a serial configuration (e.g., in a chain or ring), each of those IO modules may receive, besides its own recipient-specific management messages from the switch module, at least two other types of messages: (1) recipient-specific management messages from the switch module to other IO modules in the series and (2) sender-specific management messages to the switch module from other IO modules in the series. Preferably, the management method has provisions enabling the IO modules to detect, read, and react to those incoming management messages that require their attention, and to quickly pass along those that do not.

Figure 5:
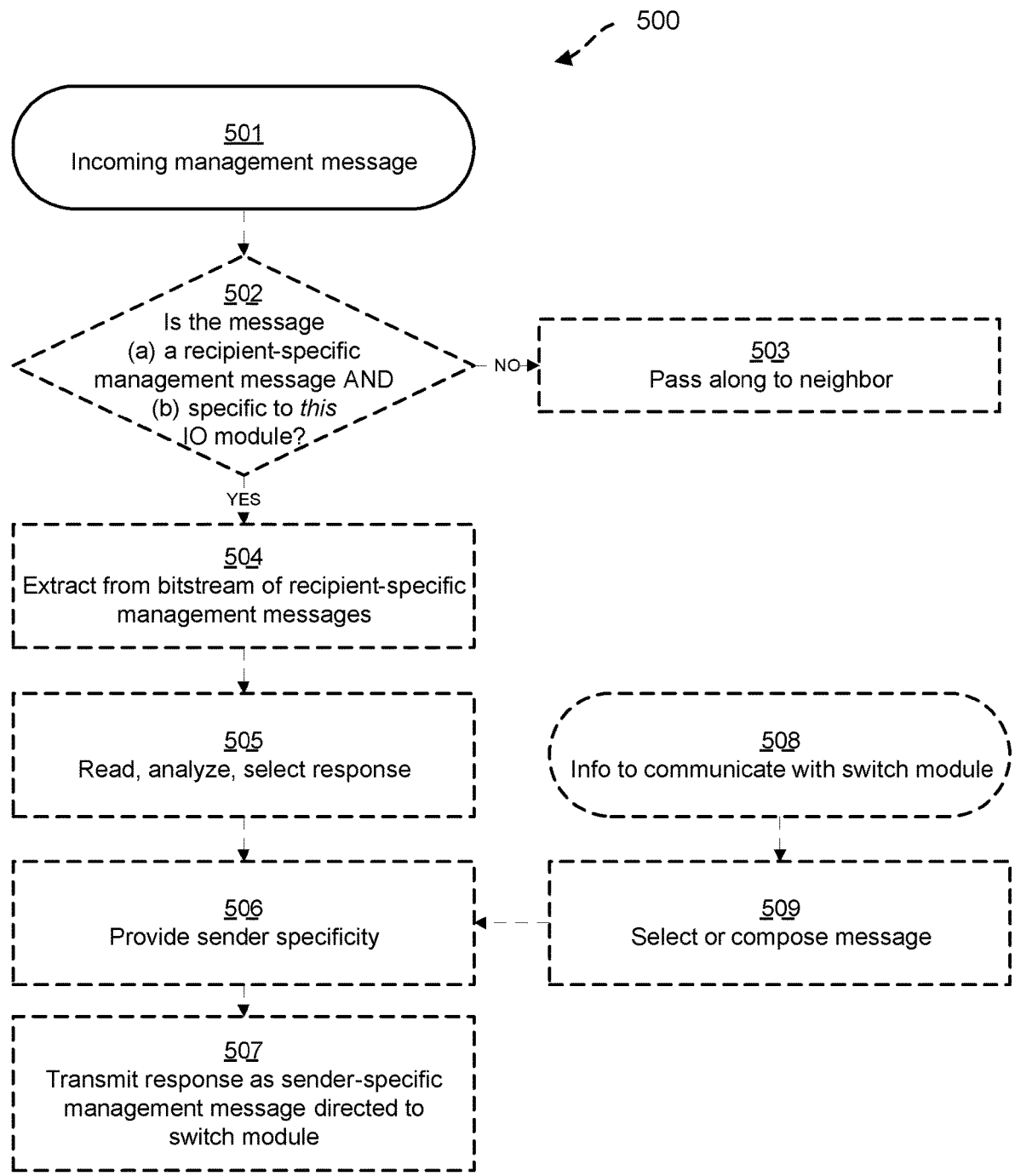
FIG. 5 is a flowchart of the management-method operations performed by each IO module, which complement the switch module's management-method actions illustrated in FIG. 4, according to one or more examples of this disclosure.

FIG. 5 is a flowchart of the management-method operations performed by each IO module, which complement the switch module's management-method actions illustrated in FIG. 4, according to one or more examples of this disclosure. Parts of method 500 may be invoked at either a first start point (block 501) or a second start point (block 508). At the first start point, the IO module receives an incoming management message (block 501). In some examples, the incoming management message is part of a bitstream containing multiple management messages. The receiving IO module determines (a) whether the management message is a recipient-specific management message, and (b) whether the receiving IO module is the specified recipient of the message (block 502). If the management message is a sender-specific management message (i.e., condition (a) does not apply), or if it is a recipient-specific management message specific to a different IO module (i.e., condition (b) does not apply), the IO module passes the message along to a neighboring (i.e., directly connected) module.

If the receiving IO module has more than one directly connected neighbor, a rule may be applied to select which neighbor receives the passed-through message or bitstream (block 503). In some examples, the rules may be different for different serial configurations (e.g., the chain of FIG. 2 or the ring of FIG. 7).

If the receiving IO module receives a recipient-specific management message (block 501) that is specific to itself (block 502 where both conditions (a) and (b) apply), the IO module may read, analyze, and select a response to the recipient-specific management message (block 505). In some examples, the IO module may also extract that recipient-specific management message from the remainder of the bitstream (block 504). The extraction (block 504) may be done before, after, or even during the process of block 505.

Having selected a response to its recipient-specific management message (block 505), the IO module includes a sender specificity to inform the switch module that the response is from the instant IO module rather than any of the other IO modules in the series (block 506). The IO module then transmits the resulting sender-specific management message toward the switch module (through any other intervening IO modules between the instant IO module and the switch module; block 507).

Another possible start point for management-message processing by an IO module is when the IO module, or a device connected to one of its IO ports, has information to communicate to the switch module (block 508). The IO module composes the message, which may optionally include selecting part of the message from a stored set of message parts (block 509). Then, proceeding as if responding to a recipient-specific management message from the switch module, the IO module adds sender specificity to the message (block 506) and transmits the resulting sender-specific management message toward the switch module (through any other intervening IO modules between the instant IO module and the switch module; block 507).

In method 500, the difference between recipient-specific management messages (directed by the switch module toward an IO module) and sender-specific management messages (directed by an IO module toward the switch module) may be provided as an indicator (e.g., a single-bit indicator if there are effectively only two types of messages) at a predetermined position within each management message. Alternatively, in a chain-type serial configuration with a switch module at one end, recipient-specific management messages may propagate downstream, and sender-specific management messages may propagate upstream. If an IO module detects whether an incoming management message came from downstream or upstream, condition (a) of block 502 may be derived without labeling.

The recipient specificity and sender specificity of the management messages may be provided by an ID code unique to a particular IO module (at least within the serial configuration, but optionally within a subsystem, system, or network). The ID code may be inserted in the message or in a data delimiter such as a packet-start, frame-start, or other suitable data-block delimiter, which may or may not be transmitted on the same channel as the message. Alternatively, if the bitstream of management messages is always ordered the same way, the specific sender or recipient (e.g., condition (b) of block 502) may be derivable from the position of the message in the bitstream. In some examples where management messages to and from some of the IO modules are asynchronous and sporadic, one or more "empty message" placeholders may be used to fill out the bitstream when fewer than all the IO modules in the series are sending or receiving. For example, the management messages may be ordered according to the recipient/sender IO module's position in the serial configuration.

In some examples of this approach, each IO module may extract the first recipient-specific management messages without further analysis, reducing the length of the recipient-specific management message bitstream by one message before transmitting the reduced bitstream to its next downstream neighbor. Additionally, each IO module may attach its own sender-specific management message as the last message in a sender-specific management message bitstream, augmenting the message count by one, before transmitting the augmented bitstream to its next upstream neighbor.

Figure 6:
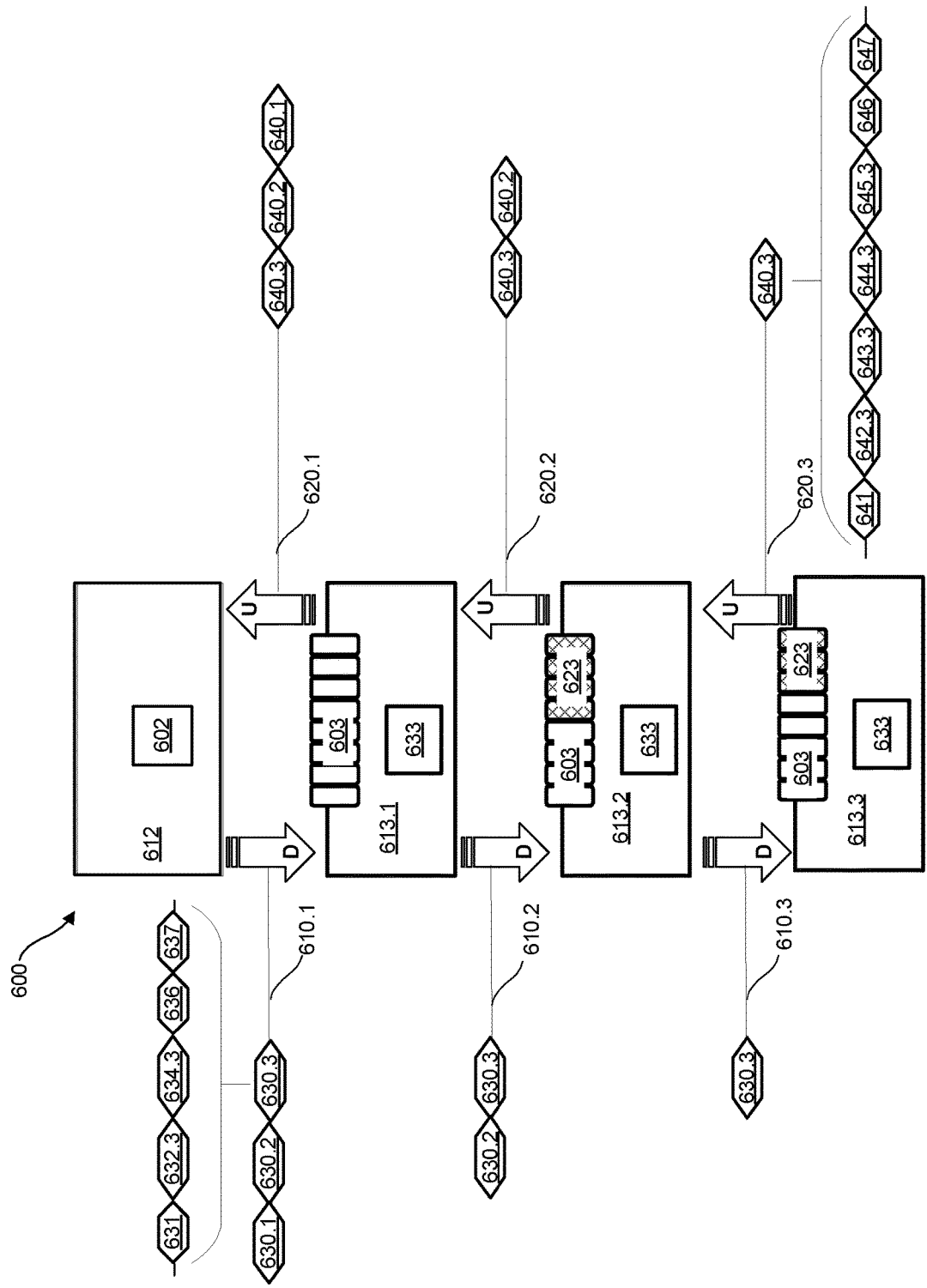
FIG. 6 is a schematic of a modular switching system with a serial chain of IO modules showing the effect of a management method like that of FIGS. 5 and 6 on bitstreams propagating through the series.

FIG. 6 is a schematic of a modular switching system with a serial chain of IO modules showing the effect of management methods similar to those of FIGS. 4 and 5 on bitstreams propagating through the series. In serial chain 600, switch module 612, including switch 602, controls IO modules 613.1, 613.2, and 613.3.

Each IO module 613.1, 613.2, and 613.3 may include an integrated circuit ("IC") 633. IC 633 may include a processor, a transceiver, a multiplexer, a demultiplexer, some other processing resource, or any other functional components—none of which are separately shown—suitable for carrying out the chosen method of managing the serial scan chain. IC 633 may include an application-specific integrated circuit ("ASIC"), field-programmable gate array ("FPGA"), complex programmable logic device ("CPLD"), programmable array logic ("PAL"), or another suitable component. Each IO module also has one or more IO ports, any or all of which may be active IO ports 603 or inactive ports 623.

In a serial chain configuration as illustrated, each IO module's directly connected neighbor may be one other IO module (e.g., distal IO module 613.3) two other IO modules (e.g., middle IO module 613.2) or an IO module 613 and a switch module (e.g., proximal IO module 613.1). Such a serial chain may carry sender-specific management messages 640.x in an upstream direction U (toward the switch module 612) and recipient-specific management messages in a downstream direction D (away from the switch module 612).

Recipient-specific management messages are transmitted from switch module 612 to the serial scan chain of IO modules 613.1, 613.2, and 613.3 in downstream direction D. As illustrated, switch module 612 is transmitting a bitstream 610.1. Bitstream 610.1 includes management message 630.1 specific to recipient IO module 613.1, management message 630.2 specific to recipient IO module 613.2, and management message 630.3 specific to recipient IO module 613.3.

Each recipient-specific management message may include several parts. For example, message 630.3 may include leading delimiter 631 (e.g., "START FRAME"), identifier 632.3 for IO module 613.3 (e.g., "3" for its order in the chain), port inputs 630.3 for IO module 613.3's active ports 603, trailing delimiter 636 (e.g., "END FRAME"), and checksum 637. Because switch module 612 regularly collects a count of active IO ports 603, it can ignore any inactive ports 623, thus removing the performance penalty associated with inactive ports in some existing switching systems. Optionally, some of the message parts (such as the delimiters) may be transmitted on separate channels from other message parts.

In some examples, identifier 632.3 may be omitted if (a) bitstream 610.1 always includes exactly the same number of recipient-specific management messages 630.1, 630.2, 630.3 as there are IO modules 613.1, 613.2, 613.3 in the series and (b) recipient-specific management messages 630.1, 630.2, 630.3 are always transmitted in the same order (e.g., the order of the corresponding recipient's position in the chain), When IO module 613.1 receives bitstream 610.1, it extracts its own recipient-specific management message 630.1 for processing and transmits the remaining messages 630.2 and 630.3 as shorter bitstream 610.2. Similarly, when IO module 613.2 receives bitstream 610.2, it extracts its own recipient-specific management message 630.2 for processing and transmits the remaining message 630.3 as a shorter (at this point, single-message) bitstream 610.3. When IO module 613.3 receives bitstream 610.3, it extracts its own recipient-specific management message 630.3 (at this point, the entire bitstream) for processing.

Other network components connected to the active IO ports 603 may transmit commands, queries, status, and other communications to the IO modules 613.1, 613.2, 613.3 for transmission to switch module 612. Similarly, each IO module's onboard IC 633 may generate its own management messages to switch module 612. Messages to switch module 612 may be received or composed at scheduled times or event-driven times. These messages may be made sender-specific to inform switch module 612 as to which of the IO modules 613.1, 613.2, or 613.3 sent the message.

In one example of sender-specific management message handling, IO module 613.3 generates sender-specific management message 640.3 and transmits it upstream in the serial scan chain as single-message bitstream 620.3. Similarly to recipient-specific management messages, sender-specific management messages may be made up of several parts. For example, message 640.3 may include leading delimiter 641 (e.g., "START FRAME"), identifier 642.3 of the sending IO module 613.3 (e.g., "3"), the card's number of active ports 643.3 (e.g., "5"), port outputs 644.3 from the card's active ports, status 645.3 of the card (e.g., "READY," "BUSY," "ERROR"), trailing delimiter 646 (e.g., "END FRAME"), and checksum 647. Optionally, some of the message parts (such as the delimiters), may be transmitted on separate channels from other message parts.

When IO module 613.2 receives bitstream 620.3, it adds its own sender-specific management message 640.2 to received message 640.3 and transmits the resulting lengthened bitstream 620.2 upstream toward switch module 612. Similarly, when IO module 613.1 receives bitstream 620.2, it adds its own sender-specific management message 640.1 to received messages 640.3 and 640.2, then and transmits the resulting lengthened bitstream 620.2 upstream toward switch module 612.

Optionally, identifier 642.3 may be omitted from sender-specific management messages 640.1, 640.2, 640.3 if (a) every IO module 613.1, 613.2, 613.3 in the chain contributes a message to every sender-specific management message bitstream and (b) the messages 640.1, 640.2, 640.3 are always in the same order (e.g., an order corresponding to the positions of IO modules 613.1, 613.2, 613.3 in the chain.

Figure 7:
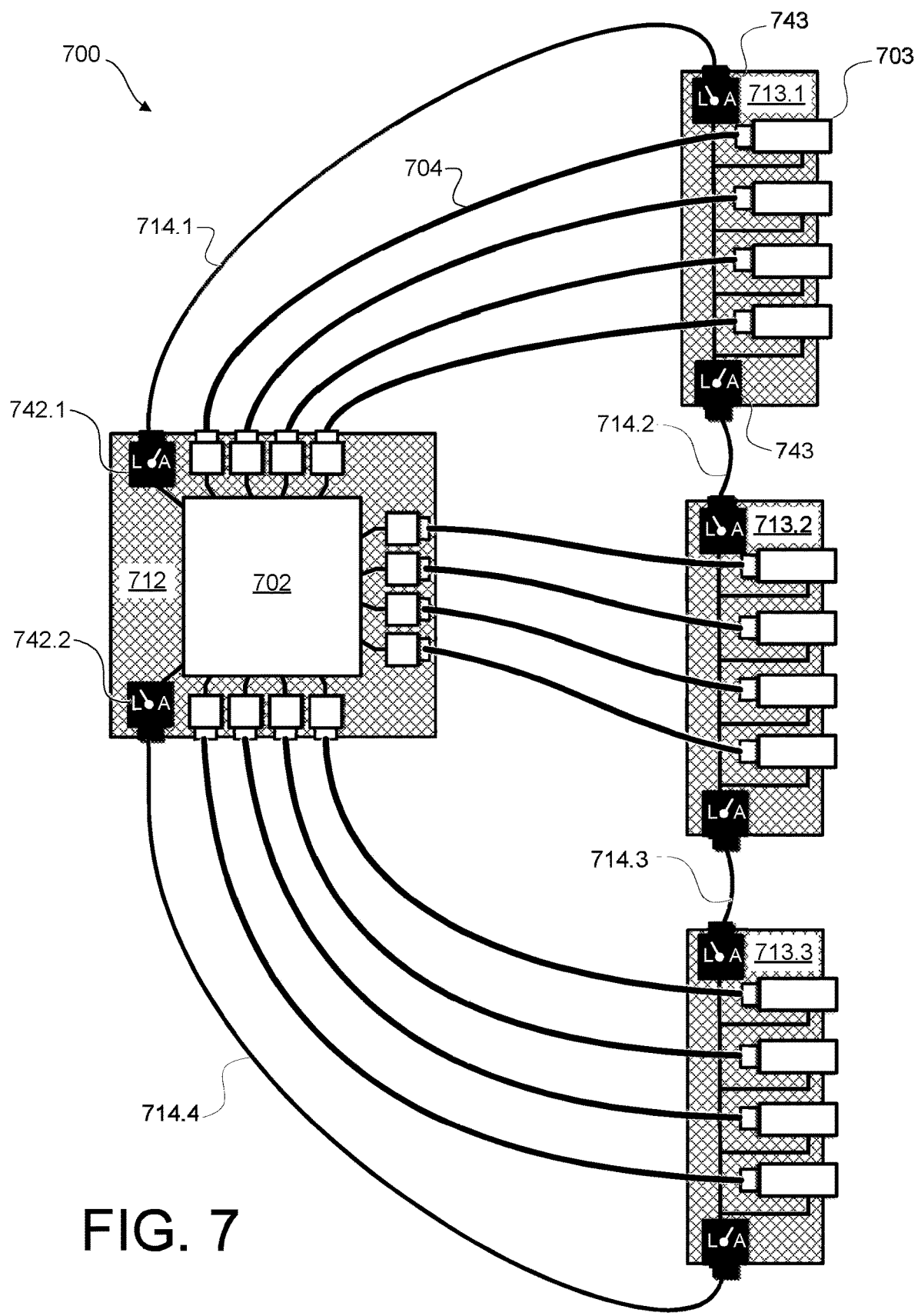
FIG. 7 is a top schematic view of a modular switching system with serial management-message connections similar to that of FIG. 3, except that the switch module and the IO modules are connected as a ring.

FIG. 7 is a top schematic view of a modular switching system with serial management-message connections similar to that of FIG. 3, except that the switch module and the IO modules are connected as a ring. As in the chain configuration of FIG. 3, switch module 712 and IO modules 713.1, 713.2, and 713.3 are connected in parallel by high-speed communication links 704 (only one indicated) for the purposes of routing the production data, but they are connected in series by auxiliary communication link 714.1, 714.2, 714.3, and 714.4 for the purposes of management message transmission and, optionally, power feeds. As in the serial chain configuration of FIG. 3, auxiliary communication link 714.1 connects switch module 712 to IO module 713.1; auxiliary communication link 714.2 connects IO module 713.1 to IO module 713.2, and auxiliary communication link 714.3 connects IO module 713.2 to IO module 713.3. In FIG. 7, however, a fourth auxiliary communication link 714.4 connects IO module 713.3 to switch module 712 to form a ring configuration.

Ring modular switching system 700 has no distal or proximal end, no upstream or downstream direction for transmission of management messages. Messages may optionally still be divided between two transmission directions: for example, recipient-specific management messages may be transmitted clockwise around the ring, and sender-specific management messages may be transmitted counter-clockwise. Alternatively, both recipient-specific management messages and sender-specific management messages may be transmitted around the ring in the same direction.

To take advantage of the message-rerouting options offered by ring configurations, switch module 712 and/or IO modules 713.1, 713.2, and 713.3 may be capable of determining which transmission direction has less traffic at any given time and transmitting their management messages in the less-crowded direction. Moreover, if one of the IO modules (e.g., 713.2) fails and cannot transmit, switch module 712 can still control the other IO modules 713.1 and 713.3. Switch module 712 may send recipient-specific management messages to IO module 713.1, and receive its sender-specific management messages in return, over auxiliary communication link 714.1. At the same time, switch module 712 may send recipient-specific management messages to IO module 713.3, and receive its sender-specific management messages in return, over auxiliary communication link 714.4. Contingencies like these allow the network to "self-heal" to some extent.

In some examples of serial rings, switch module 712 may coordinate the actions of a first management port 742.1 (where auxiliary communication link 714.1 connects to switch module 712) and second management port 742.2 (where auxiliary communication link 714.4 connects to switch module 712). At any given time, one of the management ports is in an active mode, transmitting and receiving management messages, and the other port is in a listening mode, listening to the management messages that enter and leave the active port. In the illustrated example, first management port 742.1 is set to active mode A and second management port 742.2 is set to listening mode L. If listening port 742.2 stops receiving data from active port 742.1, switch 702 senses it as a break in the chain of communication and reacts by "mastering the bus," or becoming active itself to control the parts of the chain it can reach. Optionally, one or more of the IO modules 713.1-713.3 may have management ports 743 (only two indicated) that are switchable between a listening mode L and an active mode A.

In the event of an IO module failure, if both of switch module 712's management ports 742.1 and 742.2 are still capable of communicating with (and/or delivering power to), their adjacent IO modules (713.1 and 713.3 respectively), both management ports 742.1 and 742.2 will begin operating in active mode A. Management port 742.1 will control all the IO modules from 713.1 to the failed IO module, while management port 742.2 controls all the IO modules from 713.3 to the failed IO module. Thus, the correctly functioning boards in the ring continue to operate despite the failure.

In some examples, this contingency operating mode of ring-connected modular switching system 700 also allows the switch module 712 to identify the failed IO module(s). The correctly functioning IO modules respond to recipient-specific management messages from, and transmit sender-specific management messages to, one or the other of the management ports 742.1 or 742.2. If the power feed is also through the auxiliary cables 714.$x$, a broken cable or other open circuits can be similarly worked around.

Figure 8:
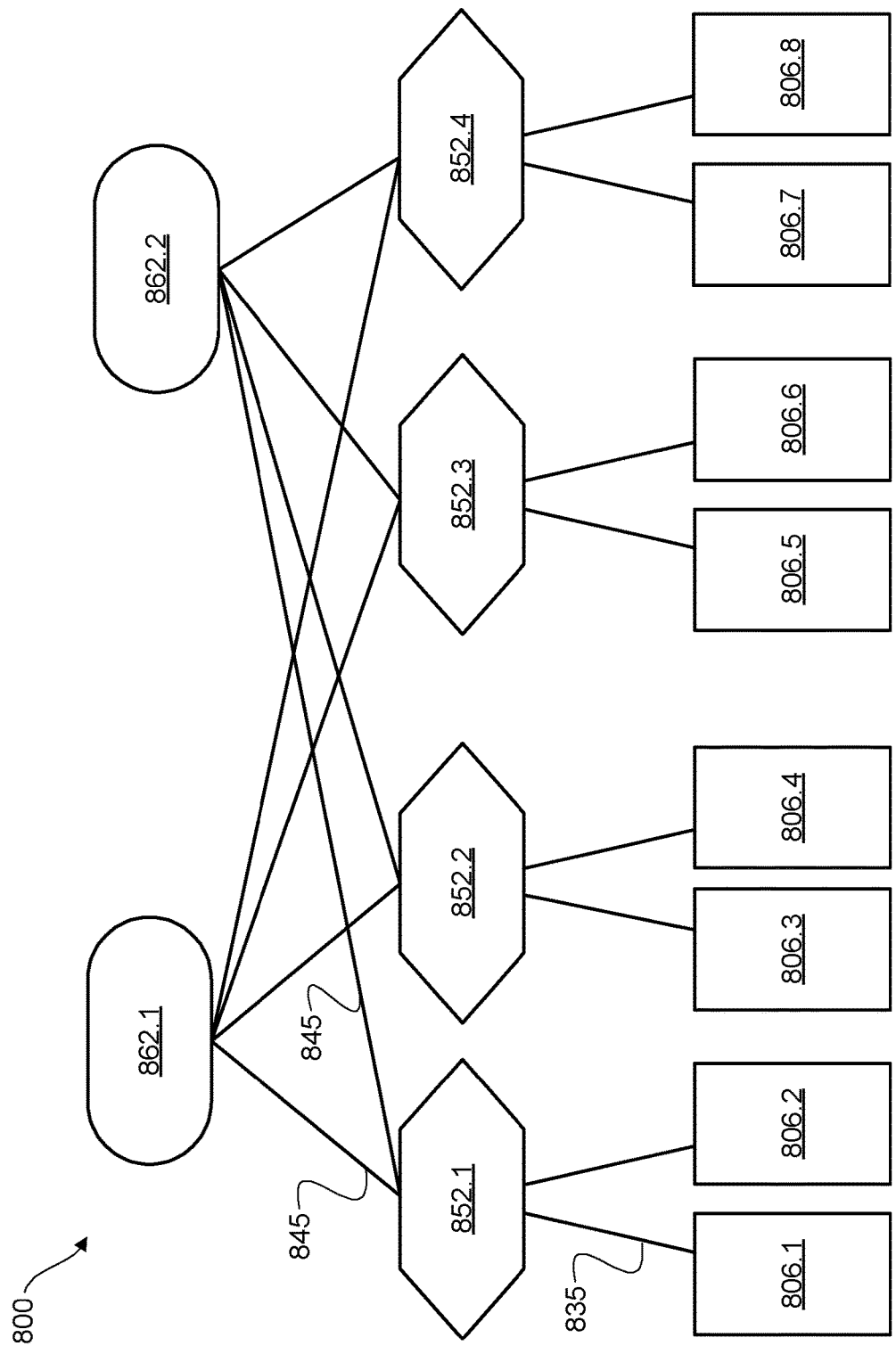
FIG. 8 is an example of a switching fabric in which the modular switching systems of FIG. 1, 2, 3, or 7 may be embedded.

FIG. 8 is an example of a switching fabric in which the modular switching systems of FIG. 1, 2, 3, or 7 may be embedded. Fabric 800 has a "fat-tree" topology. Those skilled in the art will recognize that the disclosed approaches may also be used in other fabric topologies or other types of networks. Network nodes 806.1-806.8 may be servers with processors and memory. In some examples, network nodes 806.1-806.8 may include storage devices, controllers, IO devices, transmitters, receivers, servers, clients, subsidiary networks or fabrics, or other connected devices or subsystems.

Each node 806.$x$ is connected to a first-level switching system 852.$x$ by a switch-to-node communication link 835 (only one indicated). The interface between each of the network nodes 806.1-806.8 and its connected first-level switching system 852.1-852.4 may include a fabric adapter (not shown) Communications link 835 may be wired or wireless. First-level switching systems 852.1-852.4 include both switches and IO ports. Examples of modular switching systems disclosed above may be used as first-level switching systems 852.1-852.4.

Each of the first-level switching systems 852.1-852.4 is connected to two different second-level switching systems 862.1 and 862.2 by switch-to-switch communications link 845 (only two indicated). In a larger system, each of the first-level switching systems 852.1-852.4 may be connected to more than two different second-level switching systems 862.1, 862.2. Like first-level switching systems 852.1-852.4, second-level switching systems 862.1, 862.2 include both switches and IO ports. Examples of modular switching systems disclosed above may be used as second-level switching systems 862.1, 862.2.

In some examples, switching fabric 800 has a regular repeating topology. Each of the two second-level switching systems 862.1, 862.2, is connected to four first-level switching systems 852.1-852.4. Each of the four first-level switching systems 852.1-852.4 is connected to two second-level switching systems 862.1, 862.2, and two of the network nodes 806.1-806.8. Each of the network nodes 806.1-806.8 is connected to only one of the first-level switching systems 852.1-852.4. A regular repeating topology is one approach to splitting traffic between multiple paths (optionally "ECMP," equal-cost multiple paths) while maintaining predictable behavior.

Examples in the present disclosure may also be directed to a non-transitory computer-readable medium storing computer-executable instructions and executable by one or more processors of the computer via which the computer-readable medium is accessed. A computer-readable medium may be any available medium that may be accessed by a computer. By way of example, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc ("CD"), laser disc, optical disc, digital versatile disc ("DVD"), floppy disk and Blu-ray® disc where disks usually reproduce data magnetically, while discs reproduce data optically with lasers.

Note also that the software implemented aspects of the subject matter claimed below are usually encoded on some form of program storage medium or implemented over some type of transmission medium. The program storage medium is a non-transitory medium and may be magnetic (e.g., a floppy disk or a hard drive) or optical (e.g., a compact disk read-only memory, or "CD ROM"), and may be read-only or random access. Similarly, the transmission medium may be twisted wire pairs, coaxial cable, optical fiber, or some other suitable transmission medium known to the art. The claimed subject matter is not limited by these aspects of any given implementation.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive or to limit this disclosure to the precise forms described. Obviously, many modifications and variations are possible in view of the above teachings. The examples are shown and described in order to explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A switching system, comprising:
   a switch module;
   a first input-output ("IO") module comprising a first IO port and a second IO port;
   a first communication link carrying production data between the switch module and the first IO module;
   a second communication link carrying management messages between the switch module and the first IO module; and
   a power conduit supplying power from the switch module to the first IO module;
   wherein the switch module detects a "READY" status of the first IO module and a "connected or disconnected" state of the first IO port and the second IO port; and
   wherein, after detecting that the first IO port is disconnected and the second IO port is connected, the switch module sends recipient-specific management messages to, and listens for sender-specific management messages from, the second IO port but not the first IO port.

2. The switching system of claim 1, wherein the first communication link is physically separate from the second communication link.

3. The switching system of claim 1, wherein the power conduit is combined with the second communication link.

4. The switching system of claim 1, wherein the second communication link comprises a low-loss high-speed cable.

5. The switching system of claim 1, further comprising:
   a second IO module;

a third communication link carrying production data between the switch module and the second IO module;
a fourth communication link carrying management messages to and from second IO module; and
a second power conduit supplying power to the second IO module.

6. The switching system of claim 5, wherein the fourth communication link and the second power conduit connect the second IO module to the switch module.

7. The switching system of claim 5, wherein the fourth communication link and the second power conduit connect the second IO module to the first IO module.

8. The switching system of claim 7,
wherein the switch module comprises a plurality of management ports;
wherein the second communication link is connected to the switch module through a first one of the management ports; and
further comprising a fifth communication link connecting the second IO module to the switch module through a second one of the management ports.

9. The switching system of claim 8, further comprising a third power conduit carrying power from the switch module to the second IO module;
wherein the second IO module receives power through the second power conduit unless a system condition precludes it; and
wherein the switch module provides power to the second IO module through the third power conduit if the first IO module is unable to supply the power.

10. A switching system; comprising:
a switch module;
a first input-output ("IO") module comprising a first IO port and a second IO port;
a first communication link carrying production data between the switch module and the first IO module;
a second communication link carrying management messages between the switch module and the first IO module;
a power conduit supplying power from the switch module to the first IO module;
a second IO module;
a third communication link carrying production data between the switch module and the second IO module;
a fourth communication link carrying management messages to and from second IO module; and
a second power conduit supplying power to the second IO module;
wherein the switch module detects a "READY" status of the first IO module and a "connected or disconnected" state of the first IO port and the second IO port;
wherein the fourth communication link and the second power conduit connect the second IO module to the first IO module.

11. The switching system of claim 10; wherein the first communication link is physically separate from the second communication link.

12. The switching system of claim 10, wherein the power conduit is combined with the second communication link.

13. The switching system of claim 10, wherein the second communication link comprises a low-loss high-speed cable.

14. The switching system of claim 10, wherein, after detecting that the first RD port is disconnected and the second IO port is connected, the switch module sends recipient-specific management messages to, and listens for sender-specific management messages from, the second IO port but not the first IO port.

15. The switching system of claim 10,
wherein the switch module comprises a plurality of management ports;
wherein the second communication link is connected to the switch module through a first one of the management ports; and
further comprising a fifth communication link connecting the second RD module to the switch module through a second one of the management ports.

16. The switching system of claim 15, further comprising a third power conduit carrying power from the switch module to the second IO module;
wherein the second IO module receives power through the second power conduit unless a system condition precludes it; and
wherein the switch module provides power to the second IO module through the third power conduit if the first IO module is unable to supply the power.

* * * * *